Figure 5:
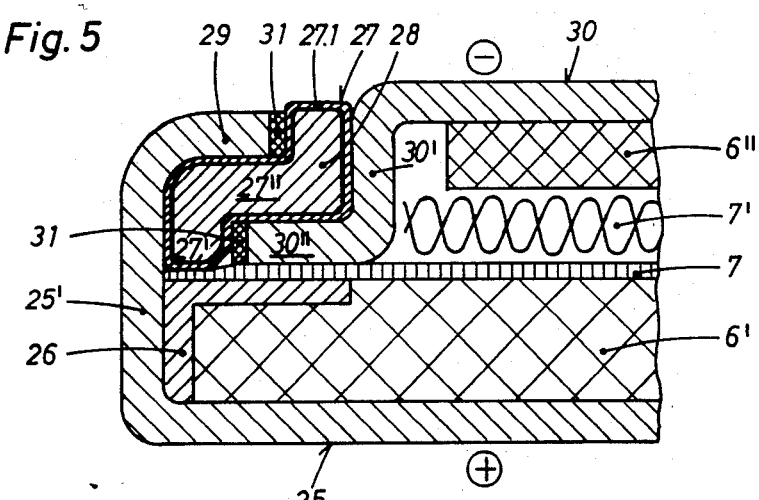

United States Patent [19]

Wyser

[11] Patent Number: 4,520,085
[45] Date of Patent: May 28, 1985

[54] GAS-TIGHT PRIMARY BATTERY

[75] Inventor: Paul-Julian Wyser, Itingen, Switzerland

[73] Assignee: Sonval S.A., Itingen, Switzerland

[21] Appl. No.: 564,315

[22] Filed: Dec. 22, 1983

[30] Foreign Application Priority Data

Jan. 7, 1983 [CH] Switzerland ............... 99/83

[51] Int. Cl.³ ............................................. H01M 2/08
[52] U.S. Cl. .................... 429/174; 429/178; 429/185
[58] Field of Search ........ 429/174, 178, 185, 181–184, 429/171–173

[56] References Cited

U.S. PATENT DOCUMENTS

| 3,960,599 | 6/1976 | Reynier | 136/111 |
| 4,115,629 | 9/1978 | Dey et al. | 429/174 X |
| 4,197,363 | 4/1980 | Topouzian | 429/174 |
| 4,294,897 | 10/1981 | Bindin | 429/174 X |
| 4,308,323 | 12/1981 | Bowsky | 429/174 X |
| 4,407,914 | 10/1983 | Inoue et al. | 429/174 |

FOREIGN PATENT DOCUMENTS 2545404 10/1975 Fed. Rep. of Germany .
616025 2/1980 Switzerland .

Primary Examiner—Charles F. LeFevour
Attorney, Agent, or Firm—Kenway & Jenney

[57] ABSTRACT

Individual cells defined by metallic housing elements which at the same time serve as leads or pole plates (1, 2), have a narrow annular insulating body (3) which is arranged in the edge zone of the housing elements and holds the pole plates (1, 2) at a mutual distance. To obtain a stable cell assembly with precisely defined and reproduceable dimensions, an insulating body (3) is proposed which consists of a metal core (4) and an electrically insulating oxide-ceramic layer, formed thereon, as the potential insulation. The insulating body (3) is irreleasably joined to the pole plates (1, 2) by means of a connecting layer (8) which is resistant to chemicals.

4 Claims, 9 Drawing Figures

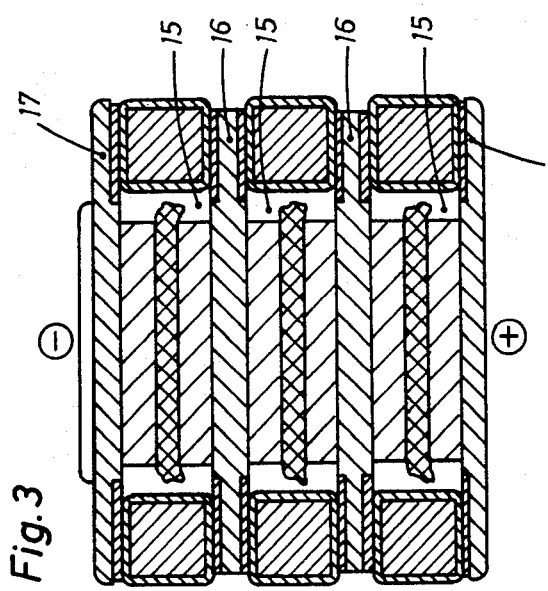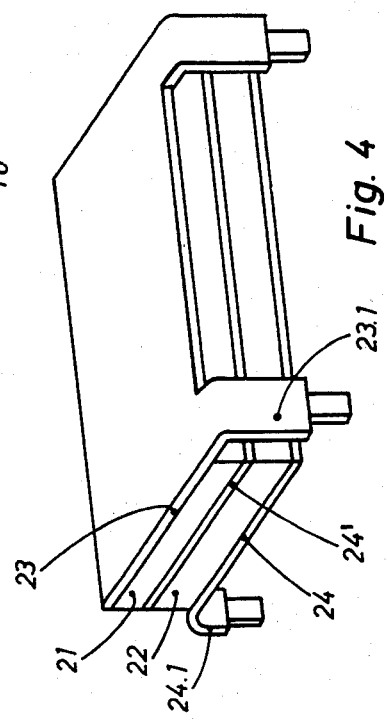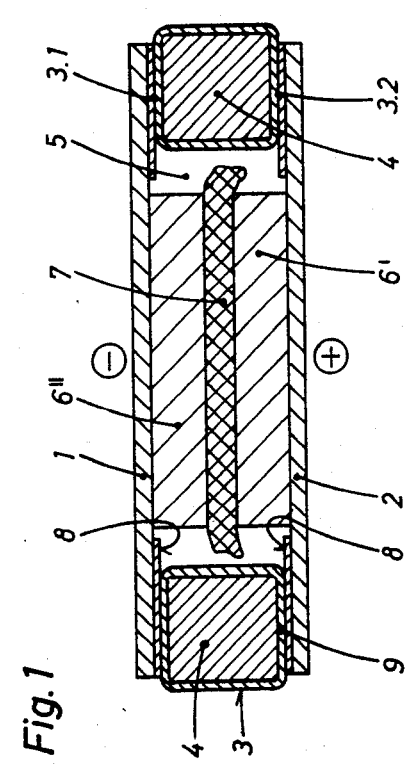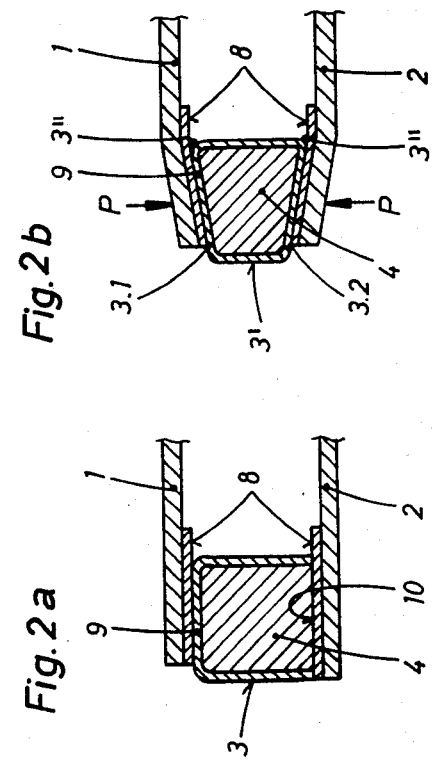

GAS-TIGHT PRIMARY BATTERY

The present invention relates to a gas-tight primary battery according to the preamble of patent claim 1.

In gas-tight primary batteries, in particular in the form of button cells and other miniaturized batteries, it is known to use cold-deformable sealing materials both as sealing components and as insulating components. The housing and cover parts used here frequently serve at the same time as pole connections, the gas-tight closure of the battery being produced on the housing by flanging the cover in or out, with interposition of the sealing and insulating component. Individual cells made in this way can be conveniently built up in various ways to give multi-cell cascades and can be made up for different purposes.

A disadvantage of the sealing and insulating closure which can be made virtually without any problems is that it is not really suitable for long-term storage of gas-tight primary batteries of high energy density such as, for example, lithium/manganese dioxide batteries, mercury batteries or silver oxide batteries, because chemicals will escape via the contact zone between the metal surface and the adjacent surface of the insulating or sealing material, even if metals having a high resistance to chemicals are used for the housing and the cover. This leakage effect entails not only the loss of capacity of the active battery material but can also cause an external short-circuit, because the tracking current paths concerned are as a rule very short. Moreover, the appliance into which the battery is fitted can be damaged.

To overcome this disadvantage, Li-MnO$_2$ cells were introduced to the market; these have a metal housing which forms one pole of the cell and is welded gas-tight and through the wall of which the other pole is taken through a glass bush which is welded gas-tight to the housing material. The main disadvantage of this cell is that in practice the insulated battery pole must be taken beyond the cell surface, so that flat batteries having an appropriate energy content cannot be formed and cascades can hardly be built up in a space-saving manner. Further disadvantages are the expensive process of welding or fusing the glass bush into the housing wall, the electrical insulation of a part of the active material of the battery from the housing, and the provision of aspecial contact between the bushed electrode in the said part of the active battery material. Because those parts of the glass bush which face the inside of the cell and the insulation of a part of the active material require a relatively large proportion of the volume in the case of a small cell volume, the resulting volume/capacity ratio is also unsatisfactory.

It is therefore the object of the invention to provide a primary battery, based on a cell which is made absolutely gas-tight by reliable suppression of the said leakage between the sealing material and the housing closure and of which the interior, available for the active material, is at an optimum in relation to the required placing or fitting space, it being possible for the individual cells to be conveniently manufactured in space-saving geometrical cqnfigurations having a large surface of active material relative to its volume and to be shaped such that they can be assembled in cascade-like layers to give multi-cell batteries.

The object of the invention, thus resulting, comprises the design of a battery with "large-surface" cells which can be built up in a simple and stable manner and have a gas-tight insulating body consisting of material which is resistant to the active material and the electrolyte, and to the surface of which an interlayer can be applied, by means of which a gas-tight connection to the adjacent housing part, which can be designed as a pole plate, can be made such that the active material is unaffected when the cell is closed.

The achievement of this object is defined by the characterizing features of patent claim 1. Claims 2–8 comprise preferred embodiments.

Particular advantages of such a battery are that it can be made very economically with proven production means, that the electrically insulated connection between the cell housing parts can be designed to be virtually free of mechanical stresses (no cold flow of the materials concerned) and that the tracking current part between the pole plates can be controlled in a simple way. Moreover, gas-tight individual cells can be manufactured with minimum thickness and surface dimensions, which hitherto was not possible for reasons of production and material technology.

Figure 6:
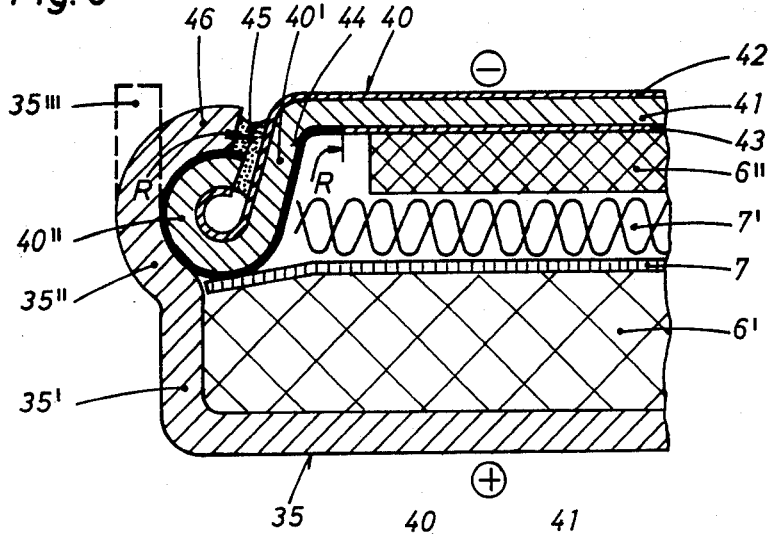
Figure 6A:
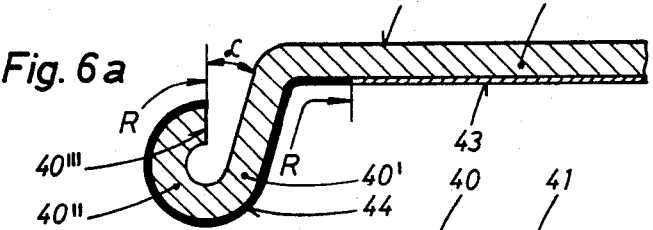
Figure 6B:
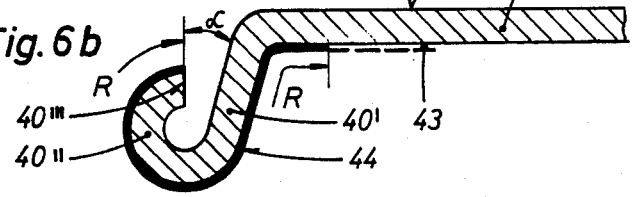

Illustrative embodiments of the subject of the invention are explained below by reference to the drawing in which:

FIG. 1 diagrammatically shows the construction of an individual cell of a battery designed according to the invention, FIGS. 2a and 2b show variants of the design of the insulating body and connection in the embodiment according to FIG. 1, FIG. 3 shows a battery assembled in the form of a cascade from several cells of the type shown in FIG. 1, with common carrier plates, FIG. 4 shows a design example of a battery according to the invention of cuboid shape according to the type shown in FIGS. 1, 2a, 2b and 3, with connection elements which can be fitted into a printed circuit board, FIG. 5 shows a further design example of the battery according to the invention, with clamped mounting of the insulating body between the housing part of the battery, and, FIGS. 6, 6a and 6b show a design example of the battery, in which the insulating body is an integral part of one of the housing parts.

In FIG. 1, 1 and 2 mark the negative (−) and positive (+) pole plates or leads of a corrosion-resistant material, for example stainless steel or steel which has been made corrosion-resistant by a surface treatment. In the edge zones, the pole plates 1 and 2 are spaced from one another by means of a gas-tight circumferential insulating body 3 with a metal core 4 which carries an oxide-ceramic layer. The pole plates 1 and 2 and the insulating body 3 define a cavity 5 in which the active material, consisting of the cathode material 6' and the anode material 6'', and a separator 7 located between these materials and containing electrolyte, are enclosed gas-tight. Tests have shown that even a 10 to 25 μm thick anodized aluminum layer is entirely adequate for the required insulating strength, in view of the relatively low cell voltage of a few volt. The anodized layer can be additionally "reinforced" by applying a further electrically insulating ceramic material.

The insulating body 3 has the shape of a closed ring, adapted to the edge outline of the pole plates 1, 2, of virtually any desired outline and with side surfaces 3.1 and 3.2 which are plane-parallel (FIGS. 1 and 2a) or converge outwards (FIG. 2b). Moreover, the pole plates 1, 2, with the exception of the sealing regions, can be structured in their two-dimensional recess instead of being plain, or one or both pole plates or leads can have a can-type depression.

An essential requirement in making a gas-tight battery is the formation of a connection or seal, which cannot be destroyed either by chemical influences or by mechanical or thermal influences, in the transition zone between the potential insulation and the pole plates or leads of the individual cell. For this purpose, in the case of batteries with insulating bodies according to FIGS. 1, 2a and 2b, the invention also envisages, in addition to adhesive bonding of the joints with cold-curing or warm-curing adhesives, soft-soldering of the joint or sealing by a cold-welding process, including combinations of these types of joining. The respective joint means are generally marked 8 in FIGS. 1, 2a and 2b.

The insulating body 3 according to FIG. 1 is provided with a 10 to 25 μm thick electrically insulating oxide-ceramic layer 9 which completely covers the metal core 4 and, as mentioned, can additionally be "reinforced" with a further oxide-ceramic layer. In the insulating body 3 according to FIG. 2a, there is no electrically insulating oxide-ceramic layer 9 on the underside of the body or core, that is to say opposite the pole plate 2, but is present complete on the three remaining surface sides. At least in the region of contact with the insulating body 3, the pole plates 1 and 2 have a coating which consists of the joint means 8 and which allows an adhesive bond or a metal/metal bond in the form of a soldered or welded joint to be made. The joining zone 10 (FIG. 2a) between the bare side surface of the metal core 4 and the pole plate 2 can also be made, as described, by adhesive bonding, soldering or welding.

Whereas in FIGS. 1 and 2a the pole plate surfaces and the side surfaces of the insulating body 3, located opposite the former, are shown as plain, parallel surfaces, a solution shown in FIG. 2b proves to be advantageous in practice. The insulating body 3' is slightly thicker radially inwards than on the periphery. The pole plates 1, 2, which are completely plain in the starting position, are in contact only with the inner edges 3" of the insulating body 3' at the start of the joining process. When the closing forces P are applied, a local pressure concentration arises on these inner walls, as a result of which a barrier-like edge zone is formed, where the compression of the joint means 8 is stronger than in the remaining zone of the joint, and this provides an additional sealing effect.

Based on the conventional production techniques in battery manufacture, it is obvious first to join the insulating body 3 to one of the pole plates 1, 2, in order to form a can which is to receive the active material 6', 6" and the separator 7, and then to place the second pole plate on top. In principle, however, it is also possible to form the joint zones 8 between the insulating body 3 and the pole plates 1, 2 as the last operation during the closure of the cell.

FIG. 3 shows a battery consisting of three individual cells 15 of the type explained by reference to FIG. 1, which cells are connected in series to give a pile. The pole plates 16 each located in the pile between two adjacent cells form partitions between components of opposite signs on the active material of these cells, whilst the pole plates 17, 18 loc on the outside have the function of the battery connection.

It is to be understood that a battery of the type shown in FIG. 3 can also be set up by merely superposing cells according to FIG. 1, in which case it is necessary to ensure an electrical connection between the opposite positive and negative pole plates in each case. This can be effected in a known manner by exerting a mechanical pressure on the ends of the pile, for example by means of a shrink-on tube, or by electrical conductive adhesive means acting on the respective plates.

A further form of the battery according to the invention is shown in FIG. 4. Individual cells 21, 22, for example of the type shown in FIG. 1 or FIGS. 2a and 2b, with an essentially rectan cross-section are built up to give a multi-shell cascade, in the manner explained by reference to FIG. 3. The pole plates 23, 24 located on the outside are provided with connection strips 23.1, 24.1 shaped in such a way they can be incorporated like an electronic component directly into a printed circuit board (not shown means of soldering lugs 23.2, 24.2, the cross-section of which are offset. As mentioned above, different battery configurations can also be realised by means of the insulating bodies 3, according to FIGS. 1, 2a and 2b which can per se be made in any desired plan patterns. Likewise, part voltages can also be tapped by molding connection strips to intermediate contact plates 24'.

FIG. 4 shows that the battery according to the invention cannot only be shaped individual element but can also be assembled together with electronic components to give units which, to enable them to function, require an uninterrupted voltage supply, such as, for example, flip-flop memories and similar components.

A further design example the battery according to the invention, preferably in form of a button cell or a rod cell, is shown in FIG. 5. The active material 6', 6" and the separator 7 impregnated with electrolyte are, together with an additonal electrolyte reservoir 7', accommodated in the cavity of a cathode can 25 which per se can be made in any desired "length" and consists, for example, of stainless steel as the lower pole plate. The separator 7 is supported in the interior of the cathode can 25 by means of a supporting ring 26 of metal or a plastic. The upper pole plate 30, also called anode cover below, is provided with an edge shoulder 30' which is drawn inwards in the manner of a tube to the distal end of which a radially oriented edge flange 30" is molded. The anode cover 30 can be made in a conventional manner, for example, from stainless steel. An aluminum ring, which has a Z-shaped cross-section and is anodized all round, as the insulating body 27 with a profiled core 28 is arranged on the periphery of the edge shoulder 30' and in contact with the top side of the edge flange 30". It is to be understood that here also the anodized layer can be additionally "reinforced" by another electrically insulating ceramic material. Furthermore, such a ceramic material can have been supplied as a layer of insulating material to a metal core made of a metal other than aluminum. The edge shoulder 30' or its edge flange 30" of the anode cover 30 rest on the separator 7 supported by the supporting ring 26, as does the lower end strip 27' of the insulating body 27. This results in a spring-elastic support structure between the upper pole plate or anode cover 30 and the lower pole plate or cathode can 25.

The cylindrical side wall 25' of the cathode can is drawn up over the supporting ring 26, the separator 7 and the lower end strip 27' on the insulating body 27 and is flanged inwards at the upper strip end of the latter in contact with the connecting strip 27" of the insulating body 27. The oxide-ceramic layer 27.1 formed on anodizing the aluminum ring (or another insulating ceramic layer structure) here also forms a closed insulating envelope which forms the potential insulation between the pole elements (anode cover 30 and cathode can 25). A flanged edge 29 ensures mechanical sealing of the battery according to FIG. 5, and sealing inserts 31 effect an absolutely tight closure of the interior of the battery from the surroundings. The sealing inserts 31 advantageously make structural connections between the adjoining surface sections of the ceramic layer(s) of the insulating body 27 and the lower or upper pole elements (cathode can 25 or anode cover 30 respectively).

FIG. 6 shows a battery assembly similar to that according to FIG. 5, wherein the mechanical connection between the cathode can 35, which per se can be chosen to have any desired depth (in the vertical direction), and the upper, preferably flat pole plate 40, also called anode cover below, is likewise made by a flanging operation on the opening edge of the cathode can. The insulating body, consisting according to the present invention of a metal or aluminum core and an oxide-ceramic surface, of the battery is shown in the example of FIG. 6, in principle and as described below, as an integral part of the anode cover 40. 6', 6" again mark the constituents of the active material and 7, 7'mark the separator and an electrolyte reservoir.

According to FIG. 6, the anode cover 40 can be made of a tri-metal, in which, for example, a covering layer 42 of nickel is rolled onto one side (the outside) of a stainless steel base 41 and an aluminum layer 43 is rolled onto the other side (the inside). In the manufacture of the anode cover 40, roundels are punched out of appropriate sheet-metal plates, a dish shape with a conical side wall 40' is then first made by means of a two-stage flanging process and an open annular flange 40" is formed on the distal region of the conical side wall 40' and, finally, edge zones R-R are provided with an anodized layer 44 on the side of the aluminum layer 43. As FIG. 6a shows, the annular flange 40" is pre-bent in this operation into an initial form or "rest" form in which its end edge 40'" is under an acute angle α to the conical side wall 40'. The fact that the annular flange 40" is provisionally not closed has two purposes: firstly, in view of the flanging of the can wall 35' for sealing purposes, as described below, it should still be elastically deformable and, secondly, at the end of the operation for closing the battery, there should be an open annular slot (FIG. 6) which is to receive a sealing material 45. The aluminum coating 43 located radially inwards of the anodized edge zone R—R remains exposed opposite the active material constituent 6".

FIG. 6b shows an embodiment variant of the anode cover for the production of which, for example, a bi-metal sheet with a stainless steel base 41 and an aluminum layer 43 rolled onto the latter is used. The reference symbols are identical to those in FIGS. 6 and 6a. The aluminum layer is milled away in the region 43, the annular flange 40" is then fitted and, finally, the remaining aluminum layer is anodized. The anode covers thus obtained are in this way provided with an all round insulating layer on one of their side surfaces. A bare metal contact surface of the base metal remains in the central inner region of the cover.

It remains now to describe the hermetical sealing of the embodiment, shown in FIG. 6, of the battery according to the invention.

An essentially cylindrical can wall 35' and, adjoining this in the axial direction, a radially outward pointing rounded flange support 35" which ends in a further cylindrical wall portion 35'" are formed on the unmounted cathode can 35 of, for example, stainless steel. The rounding of the flange support 35" matches the outline of the annular flange 40" on the anode cover 40, and the internal diameter of the cylindrical wall portion 35'" corresponds to the external diameter of the anode cover 40, as measured over the annular flange 40". After the anode cover 40 has been inserted in full-face contact with the flange support 35", the wall portion 35'", the length of which is adapted for substantially covering the annular flange 40", on the cathode can 35 is formed radially inwards. The clamping edge 46 thus produced then reaches over the annular flange 40" in such a way that a full-face press fit results. To obtain the desired-hermetical sealing in this said engagement region, it is possible, before the wall portion 35'" is formed inwards, to provide either the inside of the latter or/and the neighboring zone of the annular flange 40" with an adhesive coating. Finally, the sealing material 45 is introduced advantageously into the gap, resulting from the elastic resilience on closure of the battery, between the conical side wall 40' and the ends of the open annular flange 40" and the inward-formed clamping edge 46. The sealing material can be the same as that of the sealing inserts 31 described with reference to FIG. 5.

As already mentioned at various points in the description of the examples, it is also possible in the production of the insulating bodies to use an oxide-ceramic coating applied in a different way, in place of the very economical oxide-ceramic coating obtained by anodizing an aluminum surface. This also allows the use of metals other than aluminum for the production of the cores of the insulating bodies. In the same way, closing-contact counter-surface regions of the pole plates or anode elements and cathode can elements can be provided with electrically insulating oxide-ceramic layers, for example by means of spray-on operations, in order to obtain, for example, thicker insulating layers.

I claim:
1. A gas-tight primary battery comprising one or more individual cells comprising
   metallic housing elements,
   negative and positive leads, wherein said leads are formed from said metallic housing elements, and
   a connecting element between the outer rims of said negative and positive leads, wherein said connecting element comprises a metallic body with at least one surface adjacent to said lead comprising an inner layer of aluminum and an outer, electrically insulating, layer of aluminum oxide.
2. The gas-tight primary battery of claim 1 wherein said metallic body is a ring comprising aluminum entirely covered with an anodized aluminum oxide layer.
3. The gas-tight primary battery of claim 1 wherein said metallic body comprises a composite metal with at least one surface comprising aluminum.
4. The gas-tight primary battery of claim 1 wherein said metallic body is electrically connected with one of said leads.

* * * * *